No. 881,086. PATENTED MAR. 3, 1908.
B. D. STEVENS.
VARIABLE SPEED MECHANISM.
APPLICATION FILED MAR. 16, 1907.

Witnesses,
F. S. Mann
Walter M. Fuller

Inventor,
Burt D. Stevens
By Offield Towle & Linthicum
Attys.

UNITED STATES PATENT OFFICE.

BURT D. STEVENS, OF BELOIT, WISCONSIN, ASSIGNOR TO THE BERLIN MACHINE WORKS, OF BELOIT, WISCONSIN, A CORPORATION OF WISCONSIN.

VARIABLE-SPEED MECHANISM.

No. 881,086.  Specification of Letters Patent.  Patented March 3, 1908.

Original application filed September 24, 1906, Serial No. 335,906. Divided and this application filed March 16, 1907. Serial No. 362,676.

*To all whom it may concern:*

Be it known that I, BURT D. STEVENS, a citizen of the United States, residing at Beloit, in the county of Rock and State of Wisconsin, have invented certain new and useful Improvements in Variable-Speed Mechanisms, of which the following is a specification.

My invention relates to variable speed mechanisms and belt tighteners, its object being the production of a simple belt-tightening means acting on a plurality of belts passing over pulleys of different diameters whereby a variety of speeds of the driven mechanism may be secured.

On the accompanying drawing which forms a part of this specification I have illustrated a preferred embodiment of my invention.

Figure 1:
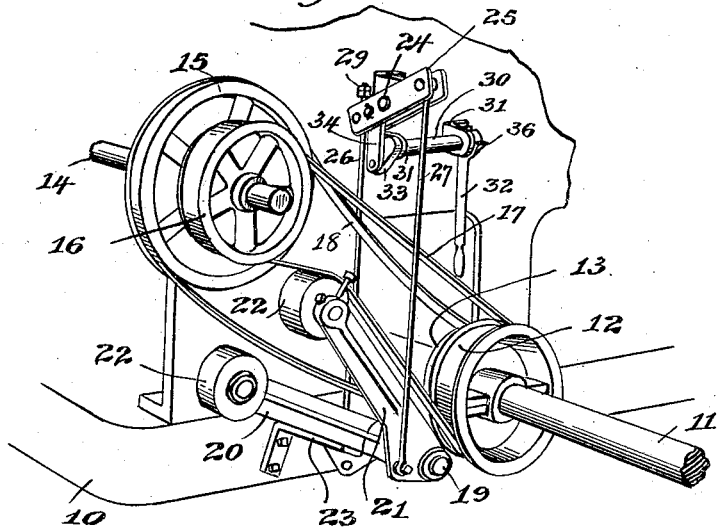
Figure 2:
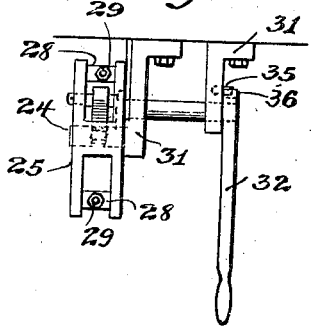

Figure 1 is a perspective view of my improved belt-tightening means; and Fig. 2 is a plan view of a portion of the same, illustrating the operating handle and the evener or walking beam and coöperating parts.

Rotatably and suitably mounted on the frame or base 10 of the machine is a driving shaft 11 equipped with a double pulley, the two parts of which 12 and 13 are of different diameters. Also mounted on the frame of the machine is a driven shaft 14 provided with a pair of pulleys 15 and 16 of different diameters, and passing over these two pair of pulleys are two belts 17 and 18 comparatively loose on the pulleys so that unless they are tightened by some means there will be no transmission of rotation of the shaft 11 to the driven shaft 14. Pivotally mounted on a stud 19 beneath the belts is a pair of swinging arms 20 and 21, each of which is equipped at its outer or free end with a roller 22 adapted to press against the under side of one of the belts to tighten the same on its pulleys. Projecting outwardly from the base of the machine is an angle-stop or abutment 23 which limits the downward movement of the arms 20 and 21, these arms resting on the top of the stop when in their lowermost position. Above the belts and adapted to oscillate on a stud or short shaft 24 I provide an evener or walking beam 25, and to connect the ends of this walking beam with the arms 20 and 21 I use rods 26 and 27 which at their lower ends are pivoted to the arms and at their upper ends have a sliding connection with the evener on opposite sides of its pivotal connection with the frame of the machine. Preferably this sliding connection with the evener or walking beam is secured by means of oscillating shafts 28 rotatably mounted in the ends of the evener, the upper ends of rods 26 and 27 passing through holes in the shafts and being provided with jam-nuts or stops 29. In order to operate this evener or walking beam manually, I use a shaft 30 mounted in bearings 31 and equipped at one end with an actuating handle 32 and at the other end with an eccentric or crank-arm 33 connected to the evener or walking beam by a link 34. The extent of movement of the handle 32 is determined by the stop-pin 35 supported in one of the bearings 31 and coöperating with which are shoulders 36 on the handle.

It will be observed that the belts are controlled by this simple mechanism and are thrown into and out of action by means of a single lever. When the handle is in substantially horizontal position, both of the arms 20 and 21 rest upon the stop 23, allowing both belts to remain slack, and because of this condition of the parts the rotation of shaft 10 is not transmitted to the driven shaft 14. If the handle 32 is pushed downwardly to a substantially vertical position the walking beam or evener 25 is oscillated so as to lift the connecting rod 27 and the arm 21, its roller 22 contacting with the under surface of belt 17, increasing the tension on the same sufficiently to enable pulley 12 to transmit its rotation to pulley 16 and shaft 14. It will be noticed that this downward turning of the handle has no influence on the rod 26, the latter sliding freely through the end of the evener. If the operating handle 32 is moved upwardly to a vertical position, then the arm 20 is lifted so as to tighten the belt 18, as will be readily understood, the arm 21 at that time resting on the stop 23. The disposition of the parts is such that when the handle 32 is arrested in its lowermost or uppermost position, the link 34 is off center with respect to crank 33 and shaft 30, so that no difficulty is encountered in swinging the handle to any of the positions desired. When the handle 32 is raised slightly from the position shown in Fig. 1 so that the link 34 passes out of the line of the center of shaft 30 the arm 21 will drop, owing to its weight, bringing the operating handle or lever to its horizontal position and throwing both of the belts out of action. A corresponding action takes place when the handle is shifted slightly from its uppermost vertical position.

To those skilled in the art it will be apparent that several changes may be made in the structure shown and described without departure from my invention and without sacrificing any of its benefits or advantages.

This application is a division of my former application on variable speed devices, Serial No. 335,906, filed September 24, 1906.

I claim:

1. A variable speed mechanism comprising a belt tightener for controlling a plurality of belts, comprising an arm for each belt, a pivoted walking beam or evener, loose connections between said walking beam or evener and said arms, and a lever for controlling said evener whereby both of the tighteners may be thrown out of action or either of them brought into action by the movement of the lever, substantially as described.

2. A variable speed mechanism comprising a belt tightener for controlling a plurality of belts, comprising an arm for each belt, a pivoted walking beam or evener, rods connecting said walking beam or evener with said arms, and a lever for controlling said evener whereby both of the tighteners may be thrown out of action or either of them brought into action by the movement of the lever, substantially as described.

3. A variable speed mechanism comprising a belt tightener for controlling a plurality of belts, comprising a pivoted arm for each belt, a pivoted walking beam or evener, sliding rods connecting said walking beam or evener with said arms, and a single lever for controlling said evener whereby both of the tighteners may be thrown out of action or either of them brought into action by the movement of the lever, substantially as described.

4. A variable speed mechanism comprising a belt tightener for controlling a plurality of belts, comprising a pivoted arm for each belt adapted to control its tension or tightness, a pivoted walking beam or evener having a sliding connection with each of said arms, a shaft, a single handle to turn said shaft, a crank-arm on said shaft, and a link connecting said crank-arm and walking beam or evener, whereby either of said arms may be brought into action or both of said arms thrown out of action, substantially as described.

5. A variable speed mechanism comprising a belt tightener for controlling a plurality of belts, comprising a pivoted arm for each belt adapted to control its tension or tightness, a pivoted walking beam or evener, rods having a sliding engagement with said walking beam or evener connecting said arms to said walking beam or evener, a shaft, a single handle to turn said shaft, a crank-arm on said shaft, and a link connecting said crank-arm and walking beam or evener, whereby either of said arms may be brought into action or both of said arms thrown out of action, substantially as described.

BURT D. STEVENS.

Witnesses:
  WALTER M. FULLER,
  L. F. McCREA.